US005824354A

United States Patent [19]

Ritter et al.

[11] Patent Number: 5,824,354

[45] Date of Patent: Oct. 20, 1998

[54] PROCESS FOR REDUCING STEROLS AND FREE FATTY ACIDS FROM ANIMAL FAT

[75] Inventors: Chris Ritter, Shawnee, Kans.; Chris Sikorski, Whiting, Ind.; Wen Shieh; Allan Hedges, both of Crown Point, Ind.

[73] Assignee: Cerestar USA, Inc., Hammond, Ind.

[21] Appl. No.: 914,452

[22] Filed: Aug. 19, 1997

Related U.S. Application Data

[63] Continuation of Ser. No. 694,796, Aug. 9, 1996, abandoned, which is a continuation of Ser. No. 392,361, Feb. 22, 1995, abandoned.

[51] Int. Cl.[6] .......... A23D 7/04

[52] U.S. Cl. .......... 426/417; 426/601; 426/608; 426/478; 426/490

[58] Field of Search .......... 426/601, 608, 426/478, 490, 417

[56] References Cited

U.S. PATENT DOCUMENTS

| | | | |
|---|---|---|---|
| 3,491,132 | 1/1970 | Reiners et al. . | |
| 4,880,573 | 11/1989 | Courregelongue et al. . | |
| 4,911,942 | 3/1990 | Yajima | 426/601 |
| 5,211,976 | 5/1993 | Cox | 426/575 |
| 5,213,829 | 5/1993 | Cox | 426/575 |
| 5,219,599 | 6/1993 | Cox | 426/575 |
| 5,223,295 | 6/1993 | Maffrand et al. . | |
| 5,232,725 | 8/1993 | Roderbourg | 426/417 |
| 5,292,546 | 3/1994 | Culley | 426/480 |
| 5,304,545 | 4/1994 | Mentink | 426/327 |
| 5,304,547 | 4/1994 | Mentink | 426/572 |
| 5,738,898 | 4/1998 | Smith | 426/614 |

FOREIGN PATENT DOCUMENTS

| | | |
|---|---|---|
| 4221229 | 1/1994 | Germany . |
| 210280 | 8/1993 | Taiwan . |

OTHER PUBLICATIONS

Lowe 1937 Experimental Cookery 2nd Edition pp. 266–275 John Wiley & Sons Inc. New York.

Charley 1970 Food Science The Ronald Press Company New York pp. 248–281.

*Primary Examiner*—Carolyn Paden

*Attorney, Agent, or Firm*—Bierman, Muserlian and Lucas

[57] ABSTRACT

The process for reducing sterols and free fatty acids from animal fat entails forming an oil-in-water emulsion using a mixing device such as a pump or an in-line mixer; and then pumping the emulsion through a conduit for a period of time. The emulsion is made from water, liquefied animal fat and cyclodextrin. The mixing device forms the emulsion in less than one minute; and the emulsion is pumped through the conduit for 5 to 60 minutes. During the time that the emulsion is moving through the conduit, the sterols and free fatty acids move from the fat phase to the water phase and form complexes with the cyclodextrin. These complexes are fairly stable and can be separated from the emulsion by centrifugation. The resulting fat has a reduced sterol and free fatty acid content.

18 Claims, 4 Drawing Sheets

PROCESS FOR REDUCING STEROLS AND FREE FATTY ACIDS FROM ANIMAL FAT

This is a continuation of application Ser. No. 08/694,796 filed Aug. 9, 1996, now abandoned, which, in turn, is a continuation of application Ser. No. 08/392,361, filed Feb. 22, 1995, now abandoned.

BACKGROUND OF THE INVENTION

1. Field of the Invention

This invention relates to a process for reducing sterols and free fatty acids from animal fat through the use of cyclodextrins.

2. Description of Related Art

Studies have linked cholesterol with increased rates of heart disease and certain types of cancer. As a result of these findings there has been a demand in the consumer and food industry for reduced cholesterol foods. For example, animal fats such as tallow and lard have fallen into disfavor as cooking oils and food ingredients due, in part, to their cholesterol content. Cholesterol free vegetable oils have displaced animal fats in a variety of applications. An animal fat with reduced cholesterol content should improve consumer perception of these products and allow them to compete more effectively against vegetable oils in the marketplace.

It is known that both sterols and free fatty acids form complexes with cyclodextrin and that this complexation phenomenon can be used to remove sterols/free fatty acids from a foodstuff. It is also known that the efficiency of the complexation process is greatly increased when water is added to the foodstuff along with the cyclodextrin. Further, it is known that these complexes can be separated from the foodstuff by centrifugation, thereby reducing the sterols/free fatty acids content of treated material. See U.S. Pat. Nos. 5,232,725 and 3,491,132.

The No. ’725 patent is directed to reducing the content of sterols/free fatty acids in an animal fat and teaches forming an oil-in-water emulsion from an aqueous slurry of cyclodextrin and liquefied animal fat. The No. ’725 patent teaches that vigorous stirring must be employed in order to form the emulsion and that vigorous stirring is necessary to form the complex. The No. ’725 patent also teaches that a water to fat ratio of 0.4:1 to 1.9:1 must be employed in order to form the emulsion. The No. ’725 patent defines the emulsion as a fine emulsion containing fat globules having a size less than 40 micrometers.

SUMMARY OF THE INVENTION

It has now been discovered that sterols and free fatty acids can be removed from liquefied animal fat without the need for vigorous stirring. More specifically, it has been found that with minimal agitation an oil-in-water emulsion comprising liquefied animal fat, water and cyclodextrin can be formed and that this crude emulsion is sufficient to remove a substantial amount of the sterols/free fatty acids from the fat.

It has also been found that vigorous stirring is not necessary for complexation. In fact, it has been found that by moving the emulsion through a conduit for a period of about 5 to about 60 minutes that complexation occurs and that substantial amounts of sterols/free fatty acids are removed from the fat.

It is both surprising and unexpected that the use of mild agitation will form the oil-in-water emulsion because the No. ’725 patent teaches that vigorous stirring must be employed to form an efficient emulsion, i.e. efficient for removing substantial amounts of sterols/free fatty acids from the fat. Furthermore, it is surprising that complexation can occur without the need for vigorous stirring. In other words, the mere fact that the emulsion exists allows the complex to form and the sterols/free fatty acids to move from an uncomplexed state in the fat phase to a complexed state in the water phase.

It is hypothesized that the cyclodextrin remains in the aqueous phase after the formation of the emulsion and the complexation between the cyclodextrin and the sterols/free fatty acids takes place at the interface between the water and the fat. Thus, the cyclodextrin remains in the aqueous phase while the sterols/free fatty acids move from the fatty phase to the aqueous phase.

Furthermore, it has been found that a conventional pipeline arrangement employing pipes and pumps can be used to form the emulsion. This avoids the need for special mixing devices. The movement of the emulsion through the pipeline system allows for formation of the complex between the cyclodextrin and sterols/free fatty acids without the need for a special mixing device.

Additionally, it has been found that the water to fat weight ratio can be as high as about 5:1 while still obtaining good sterol/free fatty acid reduction. This high water to fat weight ratio provides several advantages. First, the viscosity of the emulsion is low, making the emulsion easier to handle. Second, a high water to fat ratio means increased amounts of cyclodextrin are available in the emulsion, contributing to an efficient removal of sterols/free fatty acids from the fat.

Furthermore, it has been found quite unexpectedly that the process of the present invention results in low residual cyclodextrin in the treated fat, i.e. below about 5 ppm. Residual cyclodextrin is cyclodextrin which is present in the treated fat after the complex has been removed. Residual cyclodextrin is considered to be a contaminant which must be removed from the treated fat. Because the process of the present invention results in virtually no residual cyclodextrin, there is no need for a step to remove residual cyclodextrin from the treated fat. This also reduces the overall operating cost of the process of the present invention.

BRIEF DESCRIPTION OF THE DRAWINGS

These and other aspects of the present invention may be more fully understood by reference to the following drawings wherein.

Figure 1:
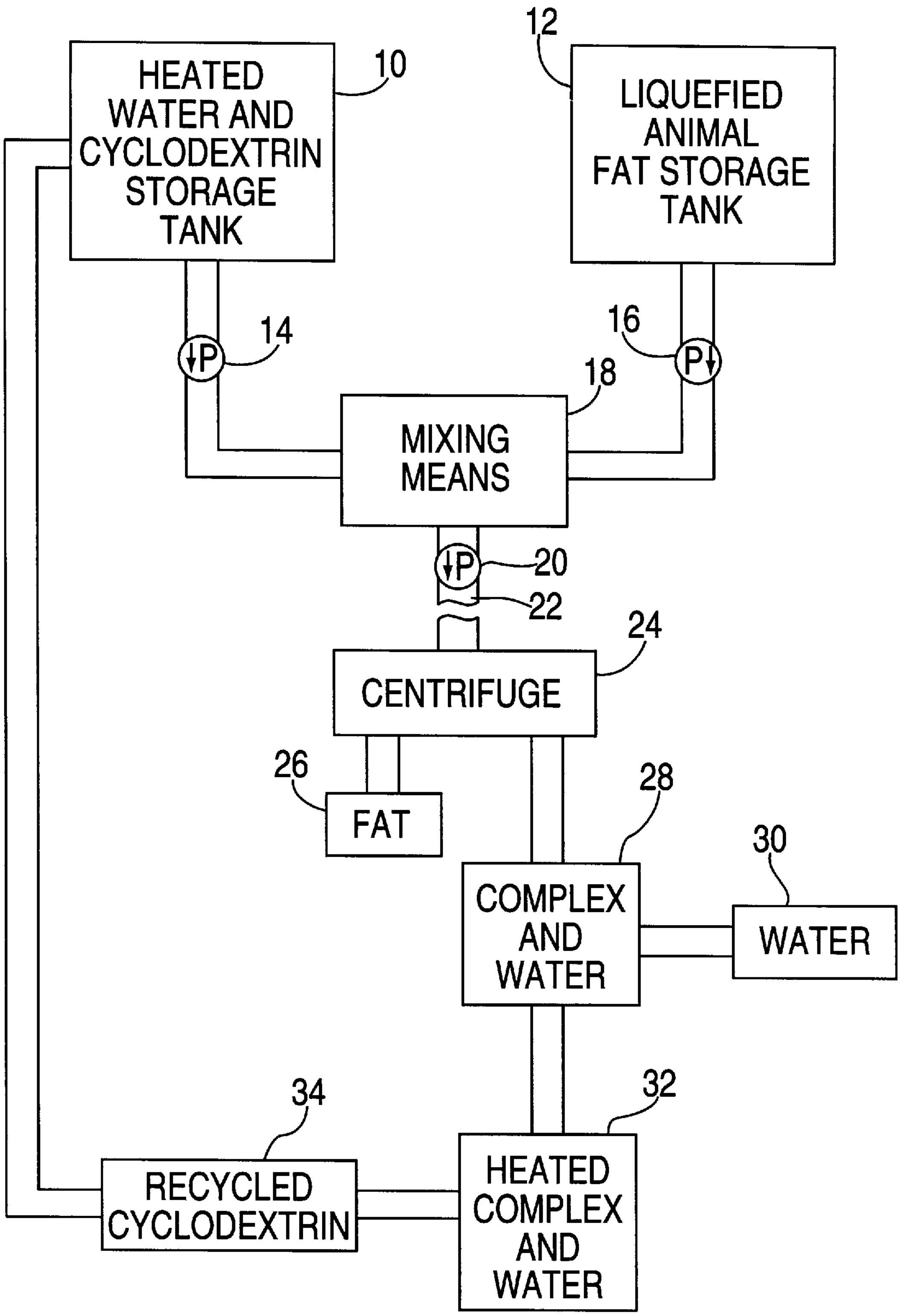
FIG. 1 illustrates a preferred embodiment of the overall process and apparatus of the present invention.

Broadly, the process of the present invention comprises the steps of:

(a) forming a uniform, milky white, oil-in-water emulsion in a mixing means in less than about one minute, said emulsion comprising liquefied animal fat, water and cyclodextrin wherein the water to fat weight ratio is about 5:1 to about 1:1 and said cyclodextrin is present in an amount of about 3% to about 10% by weight water;

(b) moving said emulsion through a conduit for a period of about 5 to about 60 minutes so that complexes form between sterols and free fatty acids in said fat and said cyclodextrin; and (c) separating said complexes from said fat wherein said fat has a reduced amount of sterol and free fatty acid and said fat has a low level of residual cyclodextrin.

DESCRIPTION OF THE PREFERRED EMBODIMENTS

In the first step, forming the emulsion, the cyclodextrin is added to the liquefied fat in the presence of water either by forming an aqueous slurry of cyclodextrin and then adding the aqueous slurry to the liquefied fat or by adding cyclodextrin to a composition of water and fat. Mixing the cyclodextrin with the fat in the absence of water produces poor results. It is most preferred to first form the aqueous slurry of cyclodextrin and then add the slurry of cyclodextrin to the fat.

The amount of cyclodextrin used in this process is about 3 to about 10% and, more preferably, about 5% by weight of water. The cyclodextrin can be alpha-, beta-, gamma-cyclodextrins or mixtures thereof. Branched cyclodextrins as well as cyclodextrin derivatives can be used in the process of the present invention. The preferred cyclodextrin is beta-cyclodextrin.

The fats which are treated in accordance with the present invention are animal fats such as tallow, lard, chicken fat, fish oil, suet, and milk fat.

The water used in the present invention is conventional tap water.

The amount of water used in the present invention is about 1 to about 5 times the weight of fat and, more preferably, about 2 to about 4 times the weight of fat. This translates into a water to fat weight ratio of about 5:1 to about 1:1 and a preferred water to fat weight ratio of about 2:1 to about 4:1.

The fat must be in a liquid state prior to forming the emulsion. If the fat is a solid, then the fat must be heated to obtain a liquid. This can be done in a conventional manner using conventional equipment. In the case of tallow, the tallow is heated to a temperature of about 40° to about 60° C. and, more preferably, about 50° C.

Preferably, the emulsion is formed from the components which have been preheated such that the emulsion has a temperature of about 50° to about 60° C. Either a mixture of water and liquefied fat is preheated to about 50° to about 60° C. and cyclodextrin added; or an aqueous slurry of cyclodextrin is preheated separately from the fat, which is also preheated to liquefy, then the two preheated liquids are combined. The preheating is conducted in a conventional manner using conventional equipment.

When the two components, fats and cyclodextrin slurry, are preheated independent of each other, the aqueous cyclodextrin slurry is preheated to about 50° to about 70° C. and, more preferably, about 60° C. The fat is preheated to about 40° C. to about 60° C., and, more preferably, about 50° C., so long as it is liquid at these temperatures.

The emulsion is formed by mixing the components together to produce a stable, uniform, milky white, oil-in-water emulsion. This emulsion must be stable at atmospheric conditions for a period of at least one minute. If the emulsion breaks into the individual components before one minute, then it is not stable and is not satisfactory for the present invention. Additionally, the emulsion should be uniform so that oil droplets are not visible to the naked eye. It has been found that this emulsion is formed by any conventional mixing means such as a tank with an impeller or an in-line mixer and that the emulsion forms in a short period of time, less than about one minute.

The conduit is preferably made of stainless steel to facilitate cleaning and sterilization, however, plastic pipe has been found to provide good results.

If necessary, additional pumps or mixing means can be positioned along the length of the conduit not only to move the emulsion through the conduit but also to maintain the emulsion.

Separation of the complexes which are formed is done in a conventional manner using conventional equipment. For example, centrifugation has yielded good results. If further purification of the fat is necessary, the fat is subjected to a second or more centrifugation steps.

After the complex has been separated from the fat, the complex is preferably heated to break the complex and recover the cyclodextrin. The recovered cyclodextrin is subsequently recycled to be used at the beginning of the process. To recover the cyclodextrin, the complex is suspended in water such that the weight ratio of water to complex is about 99:1 to about 4:1. The suspended complex is then agitated and heated to a temperature of about 90° C. to about 100° C. for a period of about 5 to about 15 minutes. The temperature is preferably maintained by continuous steam injection. This causes the cyclodextrin to separate from the complex; and subsequently, the cyclodextrin is recovered and recycled. More preferably, the suspended complex is heated to about 95° C. and the weight ratio of water to complex in the suspension is about 20:1. The recovery of the cyclodextrin is done using conventional equipment, such as a centrifuge.

A preferred embodiment of the present invention is illustrated in FIG. 1. As shown in FIG. 1, the preferred process of the present invention employs two separate storage tanks 10 and 12 to preheat the components. First storage tank 10 is used to heat a water and cyclodextrin solution and second storage tank 12 is used to form and hold liquefied animal fat. These two tanks can be equipped with impellers to maintain the uniformity of their contents. From these two tanks, the contents are separately moved by pumps 14 and 16, respectively, to mixing means 18. Mixing means 18 mixes the two liquids and causes an oil-in-water emulsion to form. This emulsion is then moved by pump 20 through conduit 22 for a period of about 5 to about 60 minutes.

To separate the water phase from the fat phase, the emulsion is subjected to centrifuge 24 and the fat component is separated into tank 26. The water phase is moved to tank 28 where additional water from tank 30 is added. The water phase is a fairly concentrated aqueous slurry of complexed cyclodextrin and sterol/free fatty acid. The aqueous slurry of complex is then heated in tank 32 to break the complex into its individual components. The separated cyclodextrin is collected and recycled through conduit 34.

It has been found that the emulsion, once formed, remains stable without the need for further agitation when the emulsion is moved through the conduit in accordance with the present invention. The emulsion is moved (pumped) through a conduit wherein complexes form between the cyclodextrin and the sterols and free fatty acids. The residence time of the emulsion in the conduit is about 5 to about 60 minutes and, more preferably, about 5 to about 20 minutes.

Both the flow rate and the size of the conduit have been found not to be critical to the present invention. Good results have been obtained by using a pipe having an inside diameter of about 2 inches (5 cm.) and a flow rate of about 2 to about 10 gallons/minute.

Figure 2:
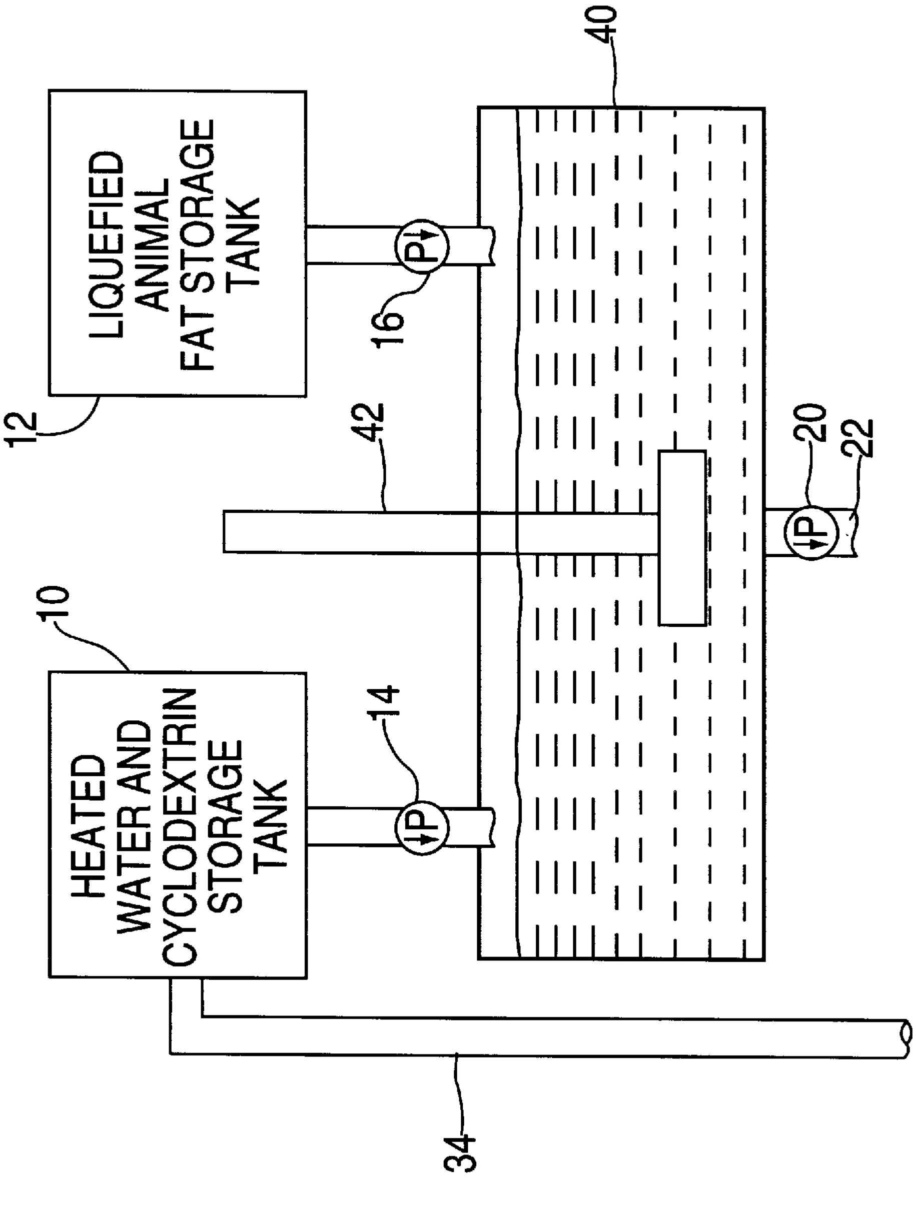
FIG. 2 illustrates a portion of a preferred embodiment of the present invention wherein the emulsion is formed by means of a tank equipped with an impeller.
Figure 3:
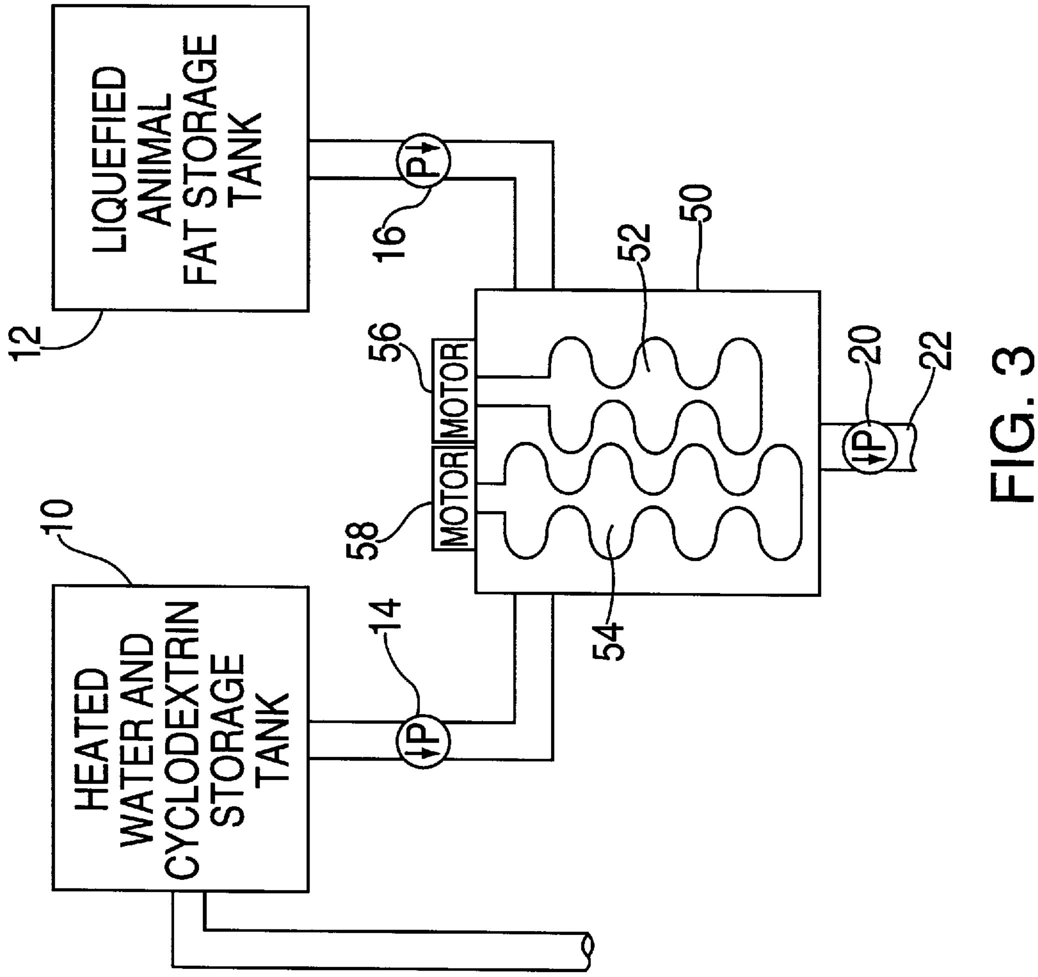
FIG. 3 illustrates a portion of a preferred embodiment of the present invention wherein the emulsion is formed by means of an in-line mixer.
Figure 4:
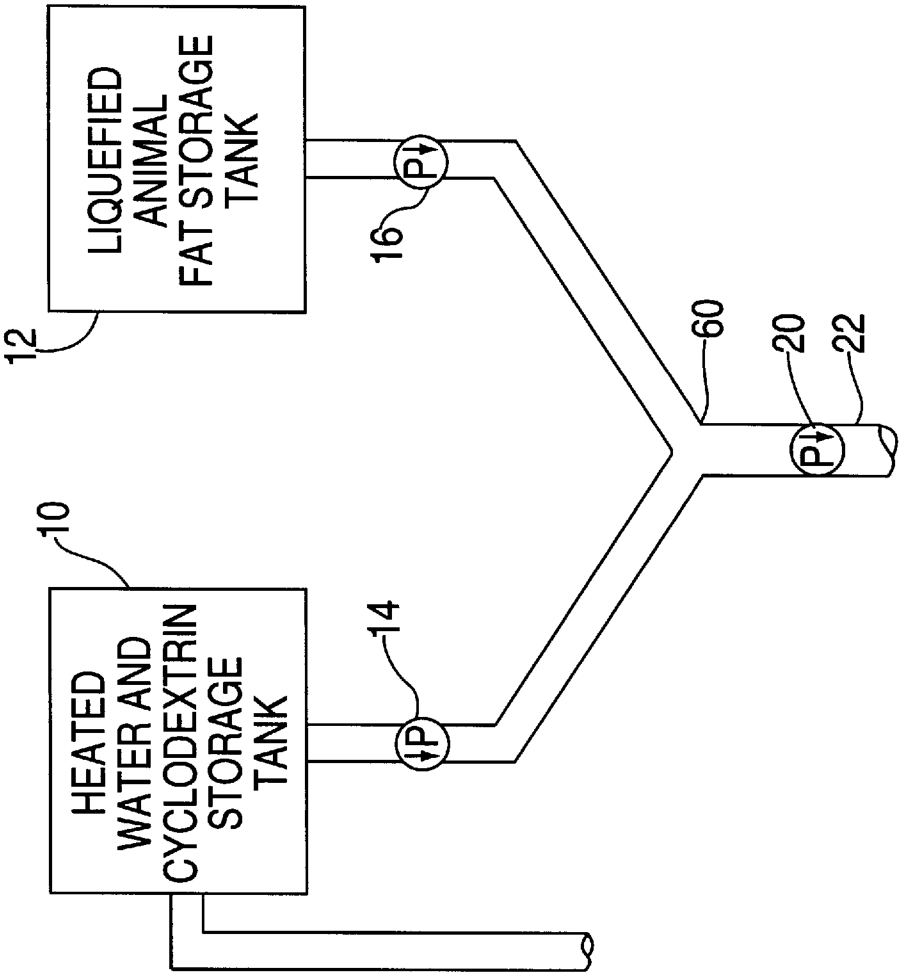
FIG. 4 illustrates a portion of a preferred embodiment of the present invention wherein the emulsion is formed by means of a Y adapter.

The mixing means for use in accordance with the present invention can be any conventional mixing means. An example of such a mixing means is a conventional tank equipped with a liner for heating and an impeller for mixing. FIG. 2 illustrates tank 40 equipped with an impeller 42. Such tanks are often referred to as agitation vessels and are sized to provide the proper conditions for forming the emulsion. Another example of the mixing means includes an in-line mixer as shown in FIG. 3. In-line mixer 50 is equipped with two screws 52, 54 which are rotated in opposite direction by their respective motors 56 and 58. Another mixing means is shown in FIG. 4. Y adapter 60 is used to mix the two liquids. Other conventional mixing means can be employed in accordance with the present invention, to include static-in-line mixers; helical blade mixers; orifice and mixing nozzles; and liquid pumps, especially shear pumps.

The emulsion forms in a very short period of time, less than about ½ minute, in the mixing means. The residence time of the combined water, liquefied fat and cyclodextrin in the mixing means is less than about one minute and, more preferably, less than about 30 seconds. As will be appreciated, the residence time in the mixing means is dependent in part on the flow rate of the liquids through the pipeline system.

The mixing means and the whole pipeline system used in the present invention should not introduce oxygen into the system or any other gas which will damage the liquefied fat. As is appreciated by those of skill in the art, the treatment time of the process in accordance with the present invention is so short that air in the system will not damage the liquefied fat, however, it is preferred that no oxygen be introduced into the system. For example, tank 40 is shown with a closed, airtight lid.

These and other aspects of the present invention may be more fully understood by reference to one or more of the following examples.

EXAMPLE 1

This example illustrates the poor results obtained when the cyclodextrin is added to liquefied fat in the absence of water.

Beta-cyclodextrin (5% by weight) was added to tallow and the mixture was preheated to 50° C. Water (50° C.) was subsequently added at a 10:1 weight ratio relative to the fat. The mixture was maintained at 50° C. and stirred at medium setting with a Corning PC-351 magnetic stirrer for three hours. The complex was separated from the fat by centrifuging the mixture at 6,000 rpm for 10 minutes at 40° C. The fat layer was collected as the product and tested for cholesterol. The cholesterol content of the tallow was reduced by 13%.

As can be seen, the additional water after the addition of cyclodextrin produced poor results.

EXAMPLE 2

This example illustrates the results obtained when following the teachings of U.S. Pat. No. 5,232,725.

Lard was mixed with an equal weight of water and preheated to 50° C. Beta-cyclodextrin was added at 5% by weight relative to the fat. The mixture was stirred for two hours at 1,500 rpm using a LIGHTNIN® LABMASTER™ fitted with an A100 impeller. The product was centrifuged at 6,000 rpm for 10 minutes at 40° C. The fat layer was collected as the product. The cholesterol content of the lard was reduced by 96%.

EXAMPLE 3

This example illustrates the prior art process of the No. '725 patent wherein the magnetic stirrer of Example 1 above was employed.

The process of Example 2 above was employed except the Corning PC-351 magnetic stirrer set at a medium speed setting was used in place of the impeller. The amount of cholesterol reduced by 98%.

EXAMPLE 4

This example illustrates the detrimental effect of stirring too vigorously.

The process of Example 2 above was employed, except that the mixing was conducted using a WARING commercial blender set on its highest mixing speed. This provides an extremely high shear mixing. The cholesterol content of the lard was reduced by only 38%.

EXAMPLE 5

This example illustrates that low speed mixing provides good results.

Tallow was mixed with an equal weight of water and preheated to 55° C. Beta-cyclodextrin was added at 5% by weight relative to the fat. The mixture was stirred for one and one-half hours at 300 rpm using a LIGHTNIN® LABMASTER™ fitted with an A100 impeller. The mixture was centrifuged at 6,000 rpm for 10 minutes at 40° C. The fat layer was collected as the product. The experiment was performed in triplicate and resulted in an average cholesterol reduction of 70%.

As can be seen, low speed mixing produces good results.

EXAMPLE 6

This example illustrates a short mixing time coupled with vigorous stirring.

The process of Example 2 above was repeated except the treatment time was lowered to 10 minutes, tallow was used in place of lard and the water tallow mix was heated to 55° C. before the addition of the cyclodextrin. The tallow had its cholesterol content reduced by 71%.

EXAMPLE 7

This example illustrates an even shorter treatment time than employed in Example 6 above.

Tallow and a 5% by weight aqueous solution of beta-cyclodextrin were heated separately to 55° C. and then combined to have a water to fat weight ratio of 1:1. They were mixed in the apparatus of Example 6 above at a speed of 1500 rpm for five (5) minutes, half the time of Example 6 above. The resulting emulsion was then centrifuged as in Example 6 and the separated fat component tested for cholesterol content. It was found that the cholesterol was reduced by 35–38%.

Thus, decreasing the treatment time by half also decreased the cholesterol reduction by about half when using a tank equipped with an impeller and using a high speed mixing process.

EXAMPLE 8

This example illustrates the results from Example 5 above employing a different mixing means, a fermenter rather than a Lightnin Labmaster.

One hundred (100) pounds of tallow and one hundred pounds of water were placed into a fermenter (tank equipped with an impeller). Five pounds of beta-cyclodextrin was added to the water and tallow. The contents of the tank were rapidly heated to 55° C. while being stirred at a rate of 300 rpm. The stirring continued for one and one-half hours. The mixture was then centrifuged at 6,000 rpm for 10 minutes at 40° C. The fat layer was collected as product. The cholesterol content of the tallow was reduced by 70%.

As can be seen by comparing the results of this example with the results of Example 5 above, there is essentially no difference as to when the components are heated.

EXAMPLE 9

This example illustrates that a short treatment time is preferred and that good centrifugation improves results.

The process of Example 8 above was employed except that a shorter treatment was employed and that the product was centrifuged twice.

| Treatment Time (minutes) | % Cholesterol Removed |
|---|---|
| 10 | 90 |
| 60 | 90 |
| 90 | 94 |

As can be seen, a shorter treatment time (10 minutes) produced the same results as a longer treatment time (60 minutes) and that good centrifugation produced better results, compare 90 minutes, 90% cholesterol reduction with 90 minutes, 70% cholesterol reduction in Example 5 above.

EXAMPLE 10

This example illustrates using a static in-line mixer as the mixing means and a conduit in accordance with the present invention.

Tallow and a 5% (by weight) aqueous solution of beta-cyclodextrin were individually preheated to 55° C. The two liquids were simultaneously pumped into a static in-line mixer at a water to fat weight ratio of 1:1 to form the emulsion. After the emulsion was formed, it moved through a pipe measuring 73 inches in length and having an inside diameter of two inches. The flow rate through the static in-line mixer and the pipe was 1.2 liters/min. Treatment time varied by collecting the emulsion as it exited from the pipe and pumping it back through the in-line mixer and 73 inches of pipe. The different samples as listed below were centrifuged at 6,000 rpm for 10 minutes at 40° C. The fat layer was collected as the product. The results of this test are listed below:

| Treatment Time (minutes) | Passes through the System | % Cholesterol Reduction |
|---|---|---|
| 5 | 1 | 46 |
| 10 | 2 | 60 |
| 20 | 4 | 68 |
| 30 | 6 | 80 |
| 60 | 12 | 84 |

The emulsion was stable throughout the 60 minutes of testing. As can be seen, there is no need for constant, vigorous stirring to either form or maintain the emulsion.

EXAMPLE 11

This example illustrates using the process of Example 10 above except that the flow rate was increased to 3.1 liters/ min. The results are listed below.

| Treatment Time (minutes) | Passes through the System | % Cholesterol Reduction |
|---|---|---|
| 3 | 2 | 66 |
| 5 | 3 | 71 |
| 10 | 6 | 69 |
| 20 | 12 | 73 |
| 30 | 18 | 71 |
| 60 | 32 | 78 |

EXAMPLE 12

This example illustrates using the process of Example 10 above except that the temperature was raised to 65° C. The results are listed below.

| Treatment Time (minutes) | Passes through the System | % Cholesterol Reduction |
|---|---|---|
| 3 | 2 | 75 |
| 5 | 3 | 74 |
| 10 | 6 | 76 |
| 20 | 12 | 86 |
| 30 | 18 | 85 |
| 60 | 32 | 85 |

As can be seen, increasing the temperature had some impact on the decholesterolization.

EXAMPLE 13

This example illustrates using the process of Example 10 above except that the concentration of beta-cyclodextrin in the aqueous solution was increased to 10%. The results are shown below.

| Treatment Time (minutes) | Passes through the System | % Cholesterol Removed |
|---|---|---|
| 3 | 2 | 64 |
| 5 | 3 | 80 |
| 10 | 6 | 87 |
| 20 | 12 | 86 |
| 30 | 18 | 84 |
| 60 | 32 | 72 |

As can be seen, increasing the cyclodextrin concentration increased the decholesterolization.

EXAMPLE 14

This example illustrates using the procedure of Example 10 above except the in-line mixer was replaced with a Y adapter as shown in FIG. 4. It was found that the emulsion formed when the two components, aqueous beta-cyclodextrin slurry and liquefied tallow, joined at a "Y" in the pipe. Additionally, six more feet of two inch inside diameter tubing was added onto the 73 inches of tubing to make a total of just over 12 feet of piping. As in Example 10, the emulsion was collected at the end of the tubing and then pumped back through one branch of the Y adapter and the 12 feet of tubing. In this way, the treatment time was varied. The results are listed below.

| Treatment Time (minutes) | Passes through the System | % Cholesterol Removed |
|---|---|---|
| 3 | 1 | 52 |
| 10 | 3 | 57 |
| 20 | 6 | 58 |
| 45 | 15 | 76 |

The emulsion is stable throughout the treatment. The Y adapter provided a good mixing means for the two liquid components, providing results which are similar to the results obtained with an in-line static mixer.

EXAMPLE 15

This example illustrates the process of the present invention wherein a longer conduit is employed.

Tallow and a 5% (by weight) aqueous solution of beta-cyclodextrin were preheated to 55° C. The two liquids were simultaneously pumped through the in-line mixer of Example 10 above and then into a 200 ft. long, two inch inside diameter tube (the 73 inches of tubing had been replaced with 200 feet of tubing). The tubing was in a serpentine arrangement. A shear pump was positioned at the end of the tubing to provide additional mixing and pumping. The weight ratio of water to fat was 4:1 and the flow rate through the system was 18.9 liters/min. The material collected after one pass through the system was centrifuged as before to obtain product. The emulsion residence time in the conduit was 25 minutes.

| Sample Description | % Cholesterol Reduction |
|---|---|
| Before shear pump | 77 |
| After shear pump | 88 |

The emulsion was stable throughout the time it was in the pipe. As can be seen, this example produced comparable results to Examples 10 and 11 at a treatment time of 25 minutes.

EXAMPLE 16

This example illustrates the process of Example 15 above at a water to fat ratio of 1:1 and with increased treatment time.

| Sample Description | % Cholesterol Reduction | Total Treatment Time (minutes) |
|---|---|---|
| Before Shear Pump | 51 | 25 |
| After Shear Pump | 70 | 25 |
| Recirculated 10 minutes | 77 | 35 |
| Recirculated 20 minutes | 79 | 45 |

The before shear pump measurement was the average of two runs.

As can be seen, lowering the water to fat ratio produced poor results and required a greater treatment time to obtain comparable results to those obtained in Example 15 above.

EXAMPLE 17

This example illustrates that placing additional mixing means in the conduit does not substantially increase the reduction of cholesterol in the fat.

Tallow and a 5% (by weight) aqueous solution of beta-cyclodextrin were preheated to 55° C. The two liquids were simultaneously pumped into a Y adapter and then through approximately 10 feet of 2 inch inside diameter tubing. The weight ratio of water to fat was 1:1. A shear pump was placed at the end of the tubing and the emulsion was collected after it passed through the shear pump. In order to simulate a shear pump every 10 feet in the conduit, the emulsion was repeatedly collected after the shear pump and then passed back through the system. Flow rate through the system was 18.5 liters/min. The mixture was recirculated through the system for the amount of time listed below. The final mixture was centrifuged and the fat layer was collected as a product.

| Sample Description | % Cholesterol Removed | Total Treatment Time (minutes) | Passes through the System |
|---|---|---|---|
| Before Shear Pump | 12 | 2 | 1 |
| After Shear Pump | 57 | 2 | 1 |
| Recirculated 10 minutes | 78 | 12 | 6 |
| Recirculated 20 minutes | 64 | 22 | 11 |

As can be seen, having a mixing means every 10 feet in the conduit did not substantially increase the cholesterol reduction.

EXAMPLE 18

This example illustrates that increasing the flow rate using the apparatus of Example 17 does not increase the cholesterol reduction.

The process employed in this example is identical to the process in Example 17 except the flow rate was doubled, 37.9 liters/min. The results are listed below.

| Sample Description | % Cholesterol Reduction | Total Treatment Time (minutes) |
|---|---|---|
| Before Shear Pump | 11 | 1 |
| After Shear Pump | 24 | 1 |

EXAMPLE 19

This example illustrates that increased turbulence does not increase the cholesterol reduction.

The process employed in this example is identical to Example 17 except that a high speed shear pump replaced the shear pump used in Example 17.

| Sample Description | % Cholesterol Removed | Total Treatment Time (minutes) | Passes through the System |
|---|---|---|---|
| Before Shear Pump | 9 | 2 | 1 |
| After Shear Pump | 26 | 2 | 1 |
| Recirculated 10 minutes | 55 | 12 | 6 |
| Recirculated 20 minutes | 62 | 22 | 11 |

EXAMPLE 20

This example illustrates the process of Example 15 except that the in-line mixer was replaced with a shear pump and the water to fat ratio was 1:1. In other words, a shear pump is used as the mixing means.

Tallow and a 5% (by weight) aqueous solution of beta-cyclodextrin were preheated to 55° C. The two liquids were simultaneously pumped into the shear pump to mix the two liquids and through a 200 ft. long, two inch diameter tube arranged in a serpentine arrangement. The weight ratio of water to fat was 1:1. The mixture was recirculated through the system for the amount of time listed below. The final mixture was centrifuged and the fat layer was collected as the product.

| Sample Description | % Cholesterol Removed | Total Treatment Time (minutes) |
|---|---|---|
| First Pass | 53 | 25 |
| Fourth Pass | 82 | 100 |

As can be seen, these results are comparable to Example 16 above where the water to fat ratio was 1:1.

EXAMPLE 21

This example illustrates using the apparatus of Example 20 above wherein a Y adapter is used to replace the shear pump as the mixing means.

The treatment time was the same as one pass through the system, 25 minutes, however, the cholesterol reduction was 37%.

EXAMPLE 22

This example illustrates an increase of the beta-cyclodextrin concentration to 10% at a water to fat ratio of 1:1.

The process of Example 21 was repeated except that the concentration of beta-cyclodextrin in the aqueous slurry was 10%. After the fourth pass through the system (100 minutes treatment time) the cholesterol reduction was 69%.

EXAMPLE 23

This example illustrates that better results are obtained with a higher water to fat ratio.

The process of Example 20 above was repeated except that the water to fat ratio was 2:1.

| Sample Description | % Cholesterol Removed | Total Treatment Time (minutes) |
|---|---|---|
| First Pass | 84 | 25 |
| Recirculated 20 minutes | 91 | 45 |

As can be seen, increasing the water to fat weight ratio to 2:1 increases the cholesterol reduction.

It will be understood that the claims are intended to cover all changes and modifications of the preferred embodiments of the invention herein chosen for the purpose of illustration which do not constitute a departure from the spirt and scope of the invention.

What is claimed is:

1. A process for reducing sterols and free fatty acids from liquefied animal fat using a high water to fat ratio (5:1 to 2:1) comprising the steps of:

(a) forming a uniform, milky white, oil-in-water stable emulsion in less than 30 seconds at a temperature of about 50° C. to about 60° C. by mixing liquefied animal fat, water and cyclodextrin wherein the water to fat weight ratio is about 5:1 to about 2:1 and said cyclodextrin is present in an amount of about 3% to about 10% by weight of water;

(b) moving said emulsion through a conduit without vigorously stirring said emulsion in said conduit, said emulsion having a residence time in said conduit of about 5 to 60 minutes so that complexes form between the cyclodextrin and said free fatty acids and said sterols in said animal fat; and (c) separating said complexes from said fat such that said fat has a reduced content of sterol and fatty acids.

2. The process of claim 1 wherein said emulsion is moved through said conduit by means of a pump.

3. The process of claim 1 wherein said emulsion is formed by the steps of:

(a1) mixing cyclodextrin and water in a slurry storage tank to form a slurry wherein said cyclodextrin is present in an amount of about 3% to about 10%;

(a2) heating said slurry to about 50° C. to about 70° C. in said slurry storage tank;

(a3) heating animal fat to a temperature of about 40° C. to about 60° C. so as to liquefy the animal fat in a liquefied animal fat storage tank;

(a4) pumping said heating slurry from said slurry storage tank into a mixer;

(a5) pumping said liquefied animal fat from said liguified animal fat storage tank into said mixer such that said liquefied animal fat is mixed with said heated slurry and forms said emulsion in less than 30 seconds.

4. The process of claim 3 wherein said mixer is an in-line mixer such that said water, liquefied fat and cyclodextrin has a residence time in said in-line mixer of less than 30 seconds.

5. The process of claim 3 wherein said mixer means is a Y-adapter and said water, liquefied fat and cyclodextrin having a residence time in said Y-adapter of less than 30 seconds.

6. The process of claim 5 wherein said animal fat is tallow.

7. The process of claim 6 wherein the separation step is accomplished by means of centrifugation.

8. The process of claim 7 further comprising the steps of suspending the separated complex in water such that the weight ratio of water to complex is about 99:1 to about 4:1; agitating and heating the suspended complex to a temperature of about 90° C. to about 100° C. for a period of about 5 to about 30 minutes to separate the beta cyclodextrin from the complex and subsequently recovering the cyclodextrin.

9. The process of claim 8 wherein the suspended complexes heated to about 95° C. and the weight ratio of water to complex in the suspension is about 9:1.

10. The process of claim 6 wherein the water to fat weight ratio is about 2:1 to about 4:1.

11. The process of claim 1 wherein said emulsion is formed by first mixing said water and liquefied fat together and then further mixing said cyclodextrin into said liquefied fat and water.

12. The process of claim 1 wherein said cyclodextrin is beta cyclodextrin.

13. The process of claim 1 wherein the separation step is accomplished by means of centrifugation.

14. The process of claim 1 further comprising the steps of suspending the separated complex in water such that the weight ratio of water to complex is about 99:1 to about 4:1; agitating and heating the suspended complex to a temperature of about 90° C. to about 100° C. for a period of about 5 to about 30 minutes to separate the cyclodextrin from the complex and subsequently recovering the cyclodextrin.

15. The process of claim 14 wherein the suspended complexes heated to about 95° C. and the weight ratio of water to complex in the suspension is about 9:1.

16. The process of claim 1 wherein said animal fat is selected from the group consisting of tallow, lard, chicken fat, fish oil, suet and milk fat.

17. The process of claim 1 wherein the water to fat weight ratio is about 2:1 to about 4:1.

18. The process of claim 1 wherein the water to fat weight ratio is about 2:1.

* * * * *

UNITED STATES PATENT AND TRADEMARK OFFICE

CERTIFICATE OF CORRECTION

PATENT NO. : 5,824,354

DATED : October 20, 1998

INVENTOR(S) : Chris Ritter et al.

It is certified that error appears in the above-indentified patent and that said Letters Patent is hereby corrected as shown below:

Column 12, line 27 (claim 3), change "liguefied" to --liquified--.

Column 12, line 34 (claim 5), delete "means".

Signed and Sealed this

Second Day of February, 1999

Attest:

Attesting Officer

*Acting Commissioner of Patents and Trademarks*